(12) United States Patent
Ozaki et al.

(10) Patent No.: US 10,129,132 B2
(45) Date of Patent: Nov. 13, 2018

(54) CONTROL SYSTEM, CONTROL METHOD, CONTROL PROGRAM, AND RECORDING MEDIUM

(71) Applicant: OMRON Corporation, Kyoto-shi, Kyoto (JP)

(72) Inventors: Toshiyuki Ozaki, Ritto (JP); Hiroyuki Tsuchida, Ayabe (JP); Koyo Ozaki, Kyoto (JP); Ryosuke Tsuzuki, Ayabe (JP); Ryota Hasegawa, Ayabe (JP); Shoichi Ohnaka, Kameoka (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/492,215

(22) Filed: Apr. 20, 2017

(65) Prior Publication Data

US 2017/0317916 A1 Nov. 2, 2017

(30) Foreign Application Priority Data

Apr. 28, 2016 (JP) ................................. 2016-091822

(51) Int. Cl.
*H04L 12/26* (2006.01)
*G05B 19/042* (2006.01)
*G05B 19/05* (2006.01)

(52) U.S. Cl.
CPC .......... *H04L 43/50* (2013.01); *G05B 19/0425* (2013.01); *G05B 19/058* (2013.01); *H04L 43/0817* (2013.01); *G05B 2219/14037* (2013.01); *G05B 2219/14047* (2013.01); *G05B 2219/15026* (2013.01); *G05B 2219/21005* (2013.01); *G05B 2219/21157* (2013.01); *G05B 2219/24033* (2013.01); *G05B 2219/25153* (2013.01); *G05B 2219/25274* (2013.01)

(58) Field of Classification Search
CPC ....... H04B 3/46; H04L 43/0817; H04L 43/50; H04L 7/0016
USPC .......................... 375/219–222, 224, 354–359
See application file for complete search history.

(56) References Cited

U.S. PATENT DOCUMENTS

| 2001/0015691 | A1* | 8/2001 | Mellen | G07C 9/00182 340/5.2 |
| 2006/0271833 | A1 | 11/2006 | Teranishi et al. | |
| 2006/0288365 | A1* | 12/2006 | Jeong | H04N 5/44513 725/39 |

(Continued)

FOREIGN PATENT DOCUMENTS

| DE | 102011085877 A1 | 5/2013 |
| EP | 1717654 A2 | 11/2006 |
| JP | H08-285914 A | 11/1996 |

OTHER PUBLICATIONS

The extended European search report (EESR) dated Oct. 6, 2017 in a counterpart European patent application.

*Primary Examiner* — Emmanuel Bayard
(74) *Attorney, Agent, or Firm* — Metrolexis Law Group PLLC

(57) ABSTRACT

An IO-Link master includes: an IO-Link communication port that communicates with an IO-Link device according to a predetermined communication protocol; a digital input port that receives a first signal value output from the IO-Link device; and a determiner that determines whether abnormality is generated in a digital input line connecting the digital input port to the IO-Link device based on a second signal value received with the IO-Link communication port and the first signal value.

19 Claims, 7 Drawing Sheets

(56) References Cited

U.S. PATENT DOCUMENTS

| | | | |
|---|---|---|---|
| 2008/0095046 A1* | 4/2008 | Jang | F24F 11/30 370/222 |
| 2008/0211660 A1 | 9/2008 | Takeuchi | |
| 2012/0110225 A1* | 5/2012 | Wessling | G04G 5/00 710/61 |
| 2012/0303324 A1 | 11/2012 | Nakatani et al. | |
| 2013/0045010 A1* | 2/2013 | Mukai | H04B 10/07 398/52 |
| 2013/0148496 A1* | 6/2013 | Nakamura | H04L 12/4035 370/225 |
| 2014/0047056 A1* | 2/2014 | Tahara | H04L 69/40 709/208 |
| 2014/0270027 A1* | 9/2014 | Oda | H02H 7/30 375/355 |
| 2015/0019919 A1* | 1/2015 | Kidamura | G06F 11/1604 714/56 |
| 2015/0089291 A1* | 3/2015 | Nishikido | H04Q 9/00 714/33 |

\* cited by examiner

CONTROL SYSTEM, CONTROL METHOD, CONTROL PROGRAM, AND RECORDING MEDIUM

CROSS-REFERENCE TO RELATED APPLICATION

This application is based on Japanese Patent Application No. 2016-091822 filed with the Japan Patent Office on Apr. 28, 2016, the entire contents of which are incorporated herein by reference.

FIELD

The present disclosure relates to a control system that detects an abnormal signal line between units connected using different protocols in an FA (Factory Automation) system.

BACKGROUND

A general FA system includes a master device, a slave device, and a device such as a sensor, and the master device controls operation of the device through the slave device and receives output data of the device. The slave device and the device are connected to each other by a signal line, and a digital output signal and an analog output signal are transmitted from the device to the slave device through the signal line.

In the case where abnormality such as a disconnection and a short circuit is generated in the signal line, it is necessary to detect the generation of the abnormality because the slave device cannot normally detect the output signal from the device.

For the signal line through which a digital signal is transmitted and received, a leakage current detector is mounted on the signal line in order to detect a leakage current, and the leakage current detector directly monitors a weak current passed during communication off of the digital signal, which allows the detection of the disconnection. A poly-switch in which a switch is turned off at a predetermined temperature or above is mounted to detect a temperature increase associated with short circuit of the signal line by the poly-switch, which allows the detection of the short circuit.

For example, Unexamined Japanese Patent Publication No. 8-285914 discloses a disconnection detecting circuit including such techniques. The disconnection detecting circuit disclosed in Unexamined Japanese Patent Publication No. 8-285914 includes a photocoupler that outputs generation of the disconnection of a lead (signal line). Specifically, in the case where the photocoupler does not detect the leakage current (in an OFF state), the generation of the disconnection is detected in the lead (signal line). Therefore, the disconnection of the lead (signal line) can be detected.

For the signal line through which an analog signal is transmitted and received, there is a technique of determining the generation of the disconnection when voltage applied to the signal line is smaller than a lower limit value of a measurement range of the analog signal.

SUMMARY

However, in the technique of detecting the abnormality of the signal line through which the digital signal is transmitted and received like the disconnection detecting circuit disclosed in Unexamined Japanese Patent Publication No. 8-285914, it is necessary to mount hardware such as the leakage current detector and the poly-switch, which results in enlargement of a unit (a slave device or a device) or an increase in cost for installing the unit.

In the technique of detecting the abnormality of the signal line through which the analog signal is transmitted and received, whether the disconnection is generated in the signal line can hardly be detected when the measurement range includes 0.

An object of an embodiment of the present invention is to be able to detect the abnormality of the signal line without enlarging the device or increasing the cost.

According to one aspect of the present invention, a control system includes: a communicator configured to communicate with an external device according to a predetermined communication protocol; a signal receiver configured to receive an output signal output from the external device; and a determiner configured to determine whether abnormality is generated in a signal line connecting the signal receiver to the external device based on data received with the communicator and an output signal value received with the signal receiver.

Accordingly, whether the abnormality is generated in the signal line connecting the signal receiver to the external device can be determined based on the data received with the communicator and the output signal value received with the signal receiver. The determiner can be mounted as software in the control system, so that the abnormality generated in the signal line can be determined without mounting hardware such as the leakage current detector and the poly-switch. Resultantly, the abnormality of the signal line can be detected without enlarging the unit or increasing the cost.

The control system according to one aspect of the present invention may further include a detector configured to detect a change of output data corresponding to the output signal value. At this point, the output signal value is a binarized digital signal value, the data received with the communicator includes the output data corresponding to the output signal value, and the determiner checks whether the output signal value changes between a detected second time and a first time before a predetermined time with respect to the second time when the detector detects that the output data changes. The determiner determines that the signal line is abnormal when checking that the output signal value changes, and determines that the signal line is not abnormal when checking that the output signal value does not change.

Accordingly, the output signal value is the binarized digital signal value, so that the determiner can determine whether the signal line is abnormal by checking whether the output signal value changes between the first time and the second time.

In the control system according to one aspect of the present invention, the output data may be an analog output value, and the detector may binarize the output data depending on whether the output data is less than or equal to a threshold, and may detect the change of the binarized output data to detect the change of the output data.

Accordingly, even if the signal receiver receives the analog output value from the external device and receives the binarized digital output value from the communicator, because the change of the output data can be detected, the determiner can determine whether the signal line is abnormal.

In the control system according to one aspect of the present invention, the predetermined time may be time double a communication cycle of the communicator.

Accordingly, in the case where a difference between the first time and the second time is shorter than the double of communication cycle of the communicator, there is a possibility that the change of the output signal value, which corresponds to the change of the output data detected with the detector, cannot be detected even if the signal line is not abnormal. Accordingly, the difference between the first time and the second time cannot be set shorter than the double of the communication cycle of the IO-Link communication. The detection of the abnormality is delayed when the difference between the first time and the second time is longer than the double of the communication cycle of the communicator. That is, when the difference between the first time and the second time is set to the double of the communication cycle of the communicator, the abnormality of the signal line can be detected at the earliest.

In the control system according to one aspect of the present invention, the output signal value may be an analog output value, the data received with the communicator may include output data corresponding to the output signal value, the output data may be an analog output value, and the determiner may calculate a difference between the output signal value and the output data, determine that the signal line is abnormal when the calculated difference is larger than a predetermined value, and determine that the signal line is not abnormal when the calculated difference is less than or equal to the predetermined value.

Accordingly, both the output signal value and the output data are the analog output value, so that the determiner can determine whether the signal line is abnormal by calculation of the difference between the output signal value and the output data.

The control system according to one aspect of the present invention may further include: a first moving average value calculator configured to calculate a first moving average value that is a moving average value of the output signal value for a predetermined time: and a second moving average value calculator configured to calculate a second moving average value that is a moving average value of the output data for a predetermined time. At this point, the determiner calculates a difference between the first moving average value and the second moving average value, determines that the signal line is abnormal when the calculated difference is larger than a predetermined value, and determines that the signal line is not abnormal when the calculated difference is less than or equal to the predetermined value.

Accordingly, each of the first and second moving average value calculators calculates the moving average value of the output signal value and the moving average value of the output data, and the determiner determines whether the signal line is abnormal by the calculation of the difference between the moving average values. Therefore, an influence of a noise mixed in the output signal value and output data is decreased, so that the determiner can more certainly determine whether the signal line is abnormal.

The control system according to one aspect of the present invention may further include a detector configured to detect that the first moving average value calculated with the first moving average value calculator becomes an upper limit value, a lower limit value, or 0. At this point, when the detector detects that the first moving average value becomes the upper limit value, the lower limit value, or 0, the determiner calculates a difference between the first moving average value and the second moving average value to determine the presence or absence of the abnormality generated in the signal line.

Accordingly, when the detector detects that the first moving average value becomes 0, the determiner can determine that the signal line is disconnected or short-circuited. When the detector detects that the first moving average value becomes 0 in the configuration in which the measurement range of the external device does not include 0, the determiner can determine that the signal line is disconnected.

When the detector detects that the first moving average value becomes the lower limit value (however, the measurement range of the external device does not include 0) or the upper limit value, the determiner can determine that the signal line is short-circuited.

In the control system according to one aspect of the present invention, the external device may be a detection device that detects a predetermined state.

In the control system, the external device may be an IO-Link (registered trademark) device, and the control system may act as an IO-Link master.

According to another aspect of the present invention, a control method includes: communicating with an external device according to a predetermined communication protocol; receiving an output signal output from the external device; and determining whether abnormality is generated in a signal line, through which the output signal received in the signal receiving step is transmitted, based on the data received in the communication step and the output signal value received in the signal receiving step.

The advantageous effect similar to the repeating device is obtained in the control method.

When a computer acts as the determiner, a control program causing the computer to act as the control system and a computer-readable recording medium in which the control program is recorded are also included in the present invention.

The one or more aspects of the present invention may have an advantageous effect that the abnormality of the signal line is detected without enlarging the device or increasing the cost.

DETAILED DESCRIPTION

First Embodiment

Hereinafter, a first embodiment of the present invention will be described with reference to FIGS. 1 to 5.

(System Outline)

Figure 2:
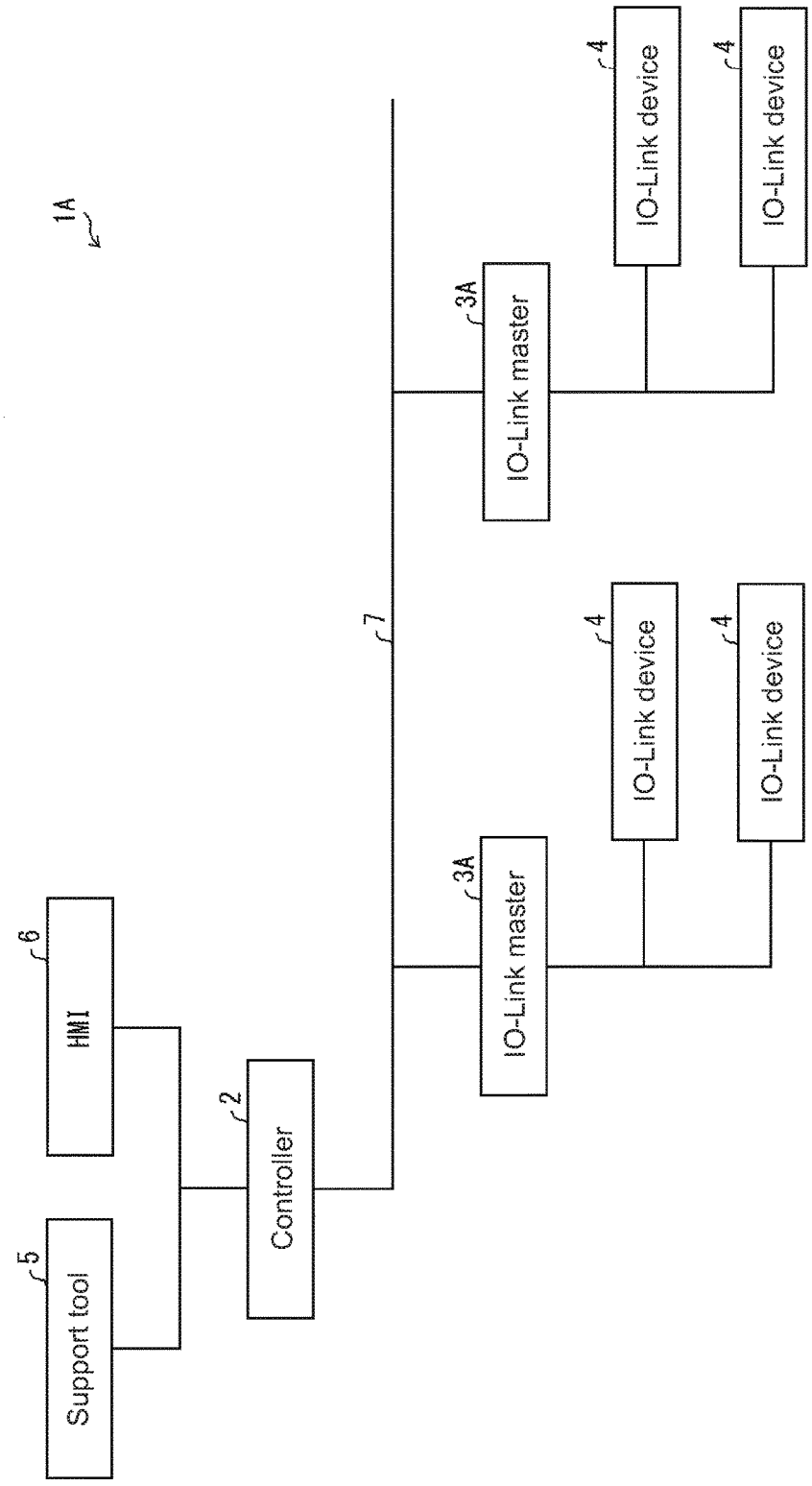
FIG. 2 is a view illustrating an outline of an IO-Link system of the first embodiment.

First an outline of a control system of the first embodiment will be described with reference to FIG. 2. FIG. 2 is a view illustrating the outline of a master-slave control system 1A. As illustrated in FIG. 2, the master-slave control system 1A includes a controller 2, an IO-Link master 3A, an IO-Link device (external device) 4, a support tool 5, and an HMI (Human Machine Interface) 6.

The master-slave control system 1A is one including the controller 2 that is a master device and at least one IO-Link master 3A that is a slave device connected to the controller 2 through a network (field network 7). The controller 2 is called a "master device" in the sense that the controller 2 manages data transmission through the field network 7, while the IO-Link master 3A is called a "slave device".

The controller 2 is the master device that controls the whole master-slave control system 1A, and is also called a PLC (Programmable Logic Controller).

The IO-Link master 3A is a repeating device that repeats data between the field network 7 including the controller 2 and the IO-Link device 4, and the IO-Link master 3A acts as the slave device of the controller 2 in the master-slave control system 1A. In the example of FIG. 2, although two IO-Link devices 4 are connected to each IO-Link master 3A, one or at least three IO-Link devices 4 may be connected to each IO-Link master 3A. The IO-Link master 3A can bidirectionally communicate with the IO-Link device 4.

The IO-Link device 4 is communicably connected to the IO-Link master 3A, and an input-system device can be used as the IO-Link device 4 that is a device (the external device or a detection device) of a control target of the controller 2. Various sensors such as a photoelectric sensor and a proximity sensor can be cited as an example of the input-system device.

Figure 1:
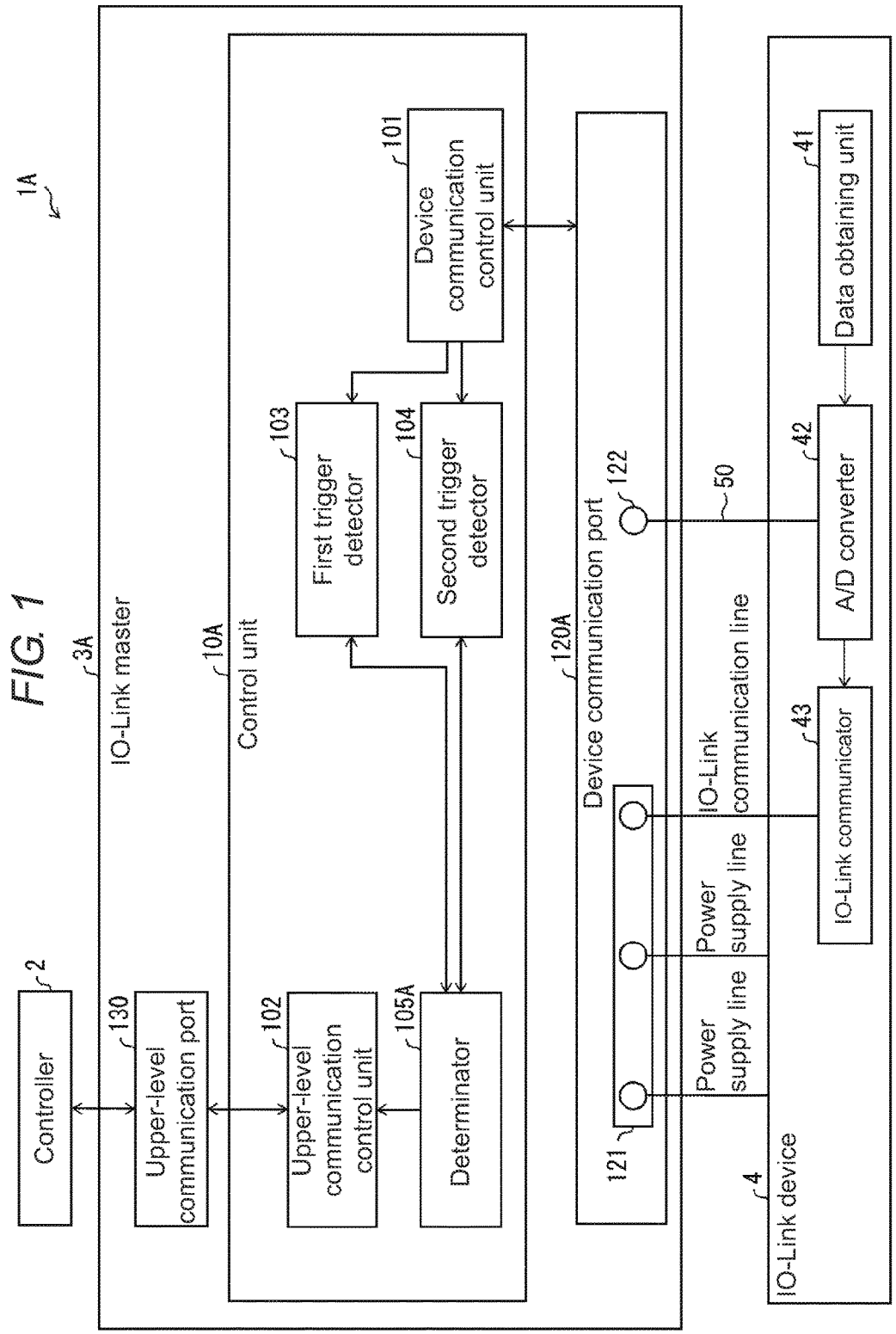
FIG. 1 is a block diagram illustrating a configuration of a main part of an IO-Link master according to a first embodiment of the present invention.

The IO-Link device 4 includes a data obtaining unit 41, an ND (Analog/Digital) converter 42, and an IO-Link communicator 43 (see FIG. 1).

The data obtaining unit 41 obtains analog data that is in a sensing target state.

The A/D converter 42 converts the analog data obtained with the data obtaining unit 41 into digital data. Specifically, the A/D converter 42 has a function of converting the analog data obtained with the data obtaining unit 41 into a binary (that is, 0 or 1), and a function of performing digital conversion of the analog data obtained with the data obtaining unit 41 for the purpose of the IO-Link communication.

The IO-Link communicator 43 conducts the IO-Link communication with the IO-Link master 3A.

The support tool 5 is an information processing device that sets various parameters to the master-slave control system 1A. For example, the support tool 5 may calculate and set timing of obtaining a status value (input refresh) and timing of updating an output value (output refresh). Typically the support tool 5 is constructed with a general-purpose computer.

The HMI 6 is a touch panel type display input device, and a user of the master-slave control system 1A can operate the controller 2 through the HMI 6, or check an operating state of the master-slave control system 1A using the HMI 6.

(IO-Link)

The IO-Link will supplementarily be described below. The IO-Link is standardized while called "Single-drop digital communication interface for small sensors and actuators" (SDCI) in IEC61131-9, and the IO-Link is a standardization technology for the communication between the master (corresponding to the controller 2) that is a control device and a device such as a sensor and an actuator. The IO-Link is a new point-to-point serial communication protocol applied to the communication between the master and the device. A photoelectric sensor and a proximity sensor can be cited as an example of the device.

The IO-Link is a communication protocol in which 32-byte (256-bit) data can be transmitted and received (bidirectional communication) unlike a conventional protocol in which only an on/off signal (1 bit) can be transmitted from the device to the master. When the master and the device are connected to each other by IO-Link, the signal can be obtained as 32-byte numerical data from the device, while only the binary data such as on/off information is conventionally received from the device. For the photoelectric sensor, because information such as a light reception amount, a detection margin, and an internal temperature can be obtained, the information is useful for a diagnosis of a product life a threshold change according to degradation over time in addition to investigation of a cause of a drawback.

For example, the application of the IO-Link can automate setting and maintenance of the device. The application of the IO-Link can significantly facilitate programming of the master, and the cost reduction of a wiring cable can be achieved.

An IO-Link system to which the IO-Link is applied will be described below. The IO-Link system is constructed with an IO-Link device (generally a sensor, an actuator, or a combination of the sensor and the actuator, and the IO-Link device 4 corresponds to the IO-Link device), a standard sensor/actuator cable, and an IO-Link master (corresponding to the IO-Link master 3A).

The IO-Link master includes one or plural ports (corresponding to a device communication port 120A (to be described later)), and one IO-Link device can be connected to each port. The IO-Link master conducts point-to-point communication with the IO-Link device. In addition to the conventional binary data (1-bit data) such as the on/off information, the IO-Link master can transmit and receive information (data larger than 1 bit) except for the binary data such as device identification information, a device communication property, a device parameter, and information about a process or diagnostic data to and from the IO-Link device.

In the case where abnormality (such as the disconnection and the short circuit) is generated in a cable (hereinafter, referred to as an IO-Link communication line) used in the IO-Link communication, because the IO-Link communication cannot be conducted, the generation of the abnormality of the IO-Link communication line can be detected by counting a communication retry time.

(Details of IO-Link Master 3A)

Details of the IO-Link master 3A in the master-slave control system 1A will be described below with reference to FIG. 1.

FIG. 1 is a block diagram illustrating a configuration of a main part of the IO-Link master 3A. As illustrated in FIG. 1, the IO-Link master 3A includes a device communication port 120A in order to communicate with the IO-Link device 4. The IO-Link master 3A includes an upper-level communication port 130 in order to communicate with the controller 2. The IO-Link master 3A includes a control unit 10A that integrally controls each unit of the IO-Link master 3A.

The device communication port 120A includes an IO-Link communication port (communicator) 121 and a digital input port (signal receiver) 122.

Figure 3:
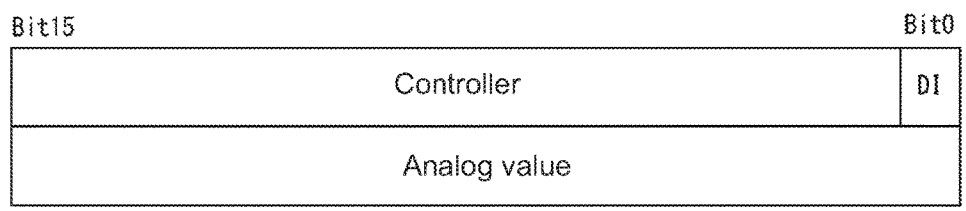
FIG. 3 is a view illustrating a data format output from an IO-Link device by IO-Link communication in the first embodiment.

The cable (IO-Link communication line) is connected to the IO-Link communication port 121 in order to conduct the IO-Link communication between the IO-Link master 3A and the IO-Link device 4. The data output from the IO-Link device 4 by IO-Link communication will be described below with reference to FIG. 3. FIG. 3 is a view illustrating a data format output from the IO-Link device 4 by IO-Link communication. As illustrated in FIG. 3, the data output from the IO-Link device 4 by IO-Link communication includes the status of the IO-Link device 4, the numerical data in which the analog value obtained with the IO-Link device 4 is converted into the digital value, and the binary data (DI) of the on/off information obtained with the IO-Link device 4.

A digital input line (signal line) 50 is connected to the digital input port 122 in order to transmit the data, which is converted into the binary data such as the on/off information using the A/D converter 42 of the IO-Link device 4, to the IO-Link master 3A.

In the IO-Link system in which the communication between the IO-Link master 3A and the IO-Link device 4 is conducted only by IO-Link communication, the IO-Link communication is serial communication, and communication responsiveness is inferior to direct communication of the digital or analog signal due to a delay of a communication cycle time.

On the other hand, in the master-slave control system 1A according to the first embodiment, the IO-Link master 3A includes the digital input port 122 that receives data output directly from the IO-Link device 4 in addition to the IO-Link communication port 121 used in the IO-Link communication. The obtainment of the data from the IO-Link device 4 through the digital input port 122 is superior to the IO-Link communication in the communication responsiveness. Therefore, IO response performance is improved as a whole of the master-slave control system 1A.

The control unit 10A includes a device communication control unit 101, an upper-level communication control unit 102, a first trigger detector 103, a second trigger detector (detector) 104, and a determiner 105A.

The device communication control unit 101 integrally controls the function of the IO-Link master 3A related to the communication with the IO-Link device 4.

The upper-level communication control unit 102 integrally controls the communication with the controller 2 through the field network 7.

The first trigger detector 103 detects an ON/OFF change (ON/OFF trigger) of a digital signal value (the output signal value, hereinafter referred to as a first signal value), which is binarized with the A/D converter 42 of the IO-Link device 4 and is output from the IO-Link device 4 through the digital input port 122.

The second trigger detector 104 detects an ON/OFF change (ON/OFF trigger) of a digital signal value (the output data, hereinafter referred to as a second signal value), which is binarized with the A/D converter 42 of the IO-Link device 4 and is received from the IO-Link device 4 through the IO-Link communication port 121.

Based on the first and second signal values, the determiner 105A determines the presence or absence of the abnormality generated in the digital input line 50 connecting the digital input port 122 and the IO-Link device 4 to each other. Details will be described later.

(Method for Determining Whether Digital Input Line 50 is Abnormal)

Figure 4:
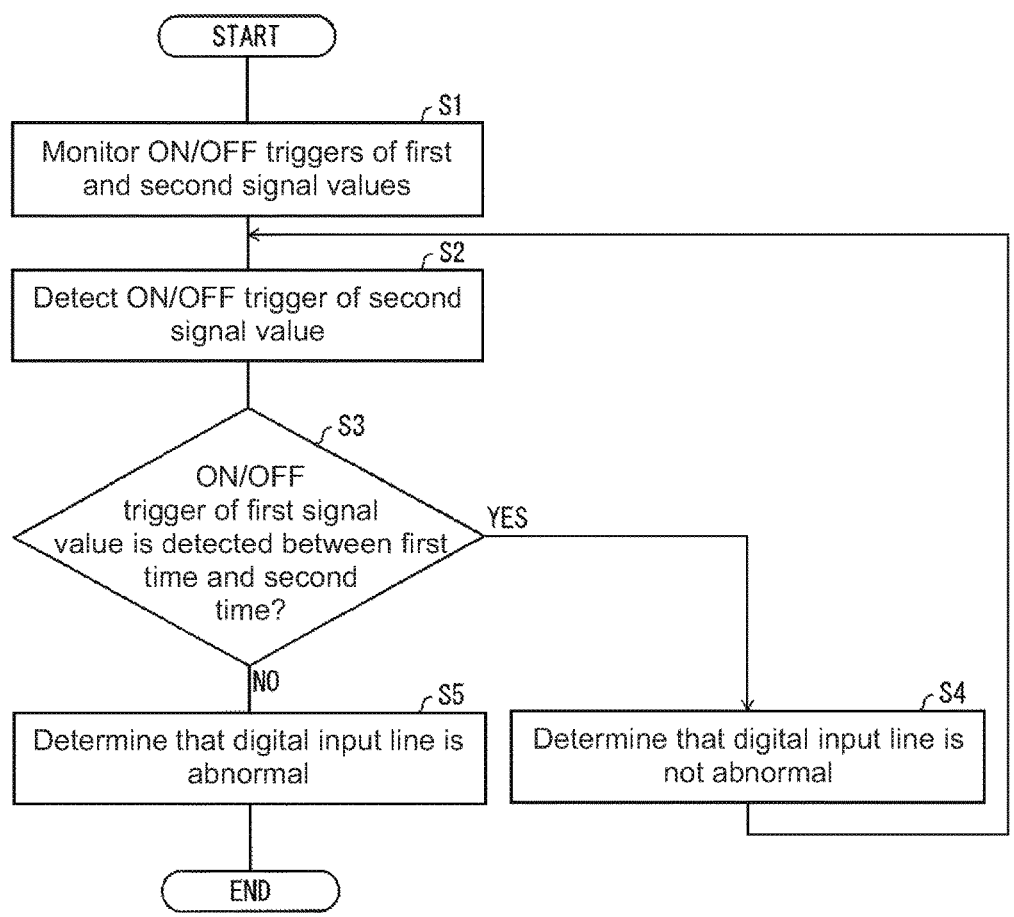
FIG. 4 is a flowchart illustrating a procedure of a method for determining whether a digital input line is abnormal in the first embodiment.

A procedure of a method for determining whether the digital input line 50 according to the first embodiment is abnormal will be described below with reference to FIG. 4. FIG. 4 is a flowchart illustrating the procedure of the method for determining whether the digital input line 50 according to the first embodiment is abnormal.

In the method for determining whether the digital input line 50 according to the first embodiment is abnormal, as illustrated in FIG. 4, the first trigger detector 103 and the second trigger detector 104 monitor the ON/OFF triggers of the first and second signal values, respectively (S1).

Figure 5:
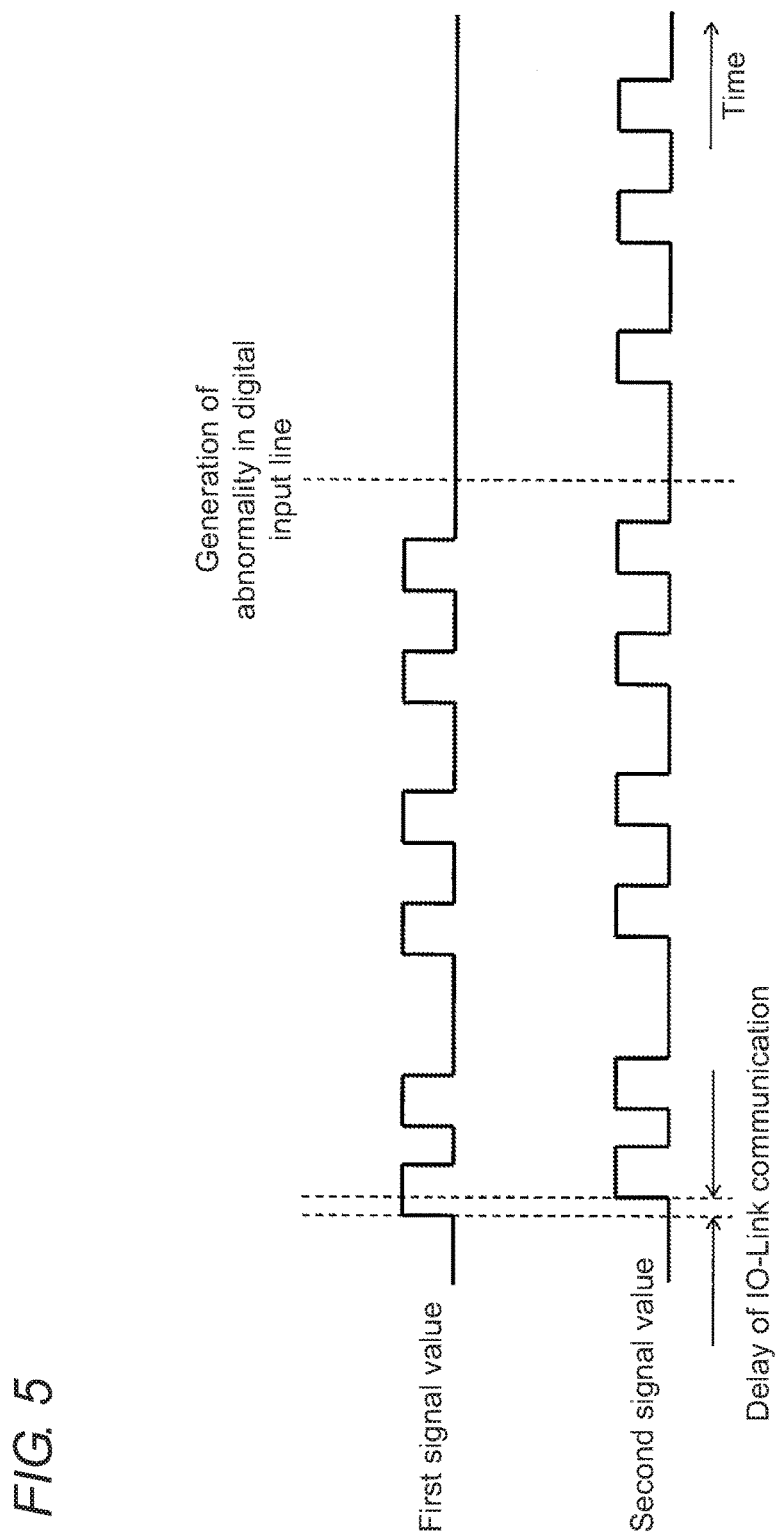
FIG. 5 is a view illustrating first and second signal values output from the IO-Link device of the first embodiment.

The first and second signal values output from the IO-Link device 4 will be described below with reference to FIG. 5. FIG. 5 is a view illustrating the first and second signal values output from the IO-Link device 4. As illustrated in FIG. 5, the first and second signal values are identical data binarized with the A/D converter 42 of the IO-Link device 4. Therefore, in the case where the digital input line 50 and the IO-Link communication line are not abnormal, the IO-Link master 3A obtains the identical data as the first and second signal values. However, because the second signal value is output by IO-Link communication, a delay is generated due to the communication cycle time of the IO-Link communication compared with the first signal value output directly through the digital input line 50.

In the case where the digital input line 50 is abnormal, specifically, in the case where the digital input line 50 is disconnected or short-circuited, the IO-Link master 3A subsequently receives only one of the binary as the first signal value. That is, the first signal value does not change. Specifically, in the case where the digital input line 50 is disconnected, only an OFF value is subsequently received as the first signal value. In the case where the digital input line 50 is short-circuited, only the OFF value or an ON value is subsequently received as the first signal value. On the other hand, the ON/OFF change is generated because the second signal value obtained by IO-Link communication is normally transmitted.

When the second trigger detector detects the ON/OFF trigger of the second signal value (S2), the determiner 105A checks whether the first trigger detector 103 detects the ON/OFF trigger of the first signal value between time (hereinafter, referred to as a second time) the ON/OFF trigger of the second signal value is detected and time (hereinafter, referred to as a first time) before time (4 ms) double the communication cycle (data refresh time, for example, 2 ms) of the IO-Link communication with respect to the second time (S3).

When the first trigger detector 103 detects the ON/OFF trigger of the first signal value between the first time and the second time (YES in S3), the determiner 105A determines that the first trigger detector 103 detects the ON/OFF trigger corresponding to the ON/OFF trigger detected with the second trigger detector 104 in step S2, and determines that the digital input line 50 is not abnormal (S4). Then the flow returns to step S2.

On the other hand, when the first trigger detector 103 does not detect the ON/OFF trigger of the first signal value between the first time and the second time second time (NO in S3), the determiner 105A determines that the first trigger detector 103 does not detect the ON/OFF trigger corresponding to the ON/OFF trigger detected with the second trigger detector 104 in step S2, and determines that the digital input line 50 is abnormal (S5).

In the IO-Link master 3A of the first embodiment, a difference between the first time and the second time in step S3 is double the communication cycle of the IO-Link communication. However, the IO-Link master of the present invention is not limited to the first embodiment. Alternatively, the difference between the first time and the second time may be set to time longer than the time double the communication cycle of the IO-Link communication. However, the difference between the first time and the second time is shortened, which allows the abnormality to be detected earlier. In the case where the difference between the first time and the second time is shorter than the time double the communication cycle of the IO-Link communication, sometimes the first trigger detector 103 can hardly detect the ON/OFF trigger of the first signal value, the ON/OFF trigger of the first signal value corresponding to the ON/OFF trigger of the second signal value detected with the second trigger detector 104, even if the digital input line 50 is not abnormal. Accordingly, the difference between the first time and the second time cannot be set shorter than the double of the communication cycle of the IO-Link communication. That is, when the difference between the first time and the second time is set to the time double the communication cycle of the IO-Link communication, the abnormality of the digital input line 50 can be detected at the earliest.

As described above, the IO-Link master 3A of the first embodiment includes the IO-Link communication port 121 that communicates with the IO-Link device 4 according to a predetermined communication protocol and the digital input port 122 that receives the first signal value output from the IO-Link device 4. The IO-Link master 3A also includes the determiner 105A that determines the presence or absence of the abnormality, which is generated in the digital input line 50 connecting the digital input port 122 to the IO-Link device 4, based on the second signal value received through the IO-Link communication port 121 and the first signal value received through the digital input port 122. Specifically, when the second trigger detector 104 detects the change of the second signal value, the determiner 105A checks whether the first trigger detector 103 detects the change of the first signal value between the first time and the second time, thereby determining whether the digital input line 50 is abnormal.

The first trigger detector 103, the second trigger detector 104, and the determiner 105A are software included in the control unit 10A of the IO-Link master 3A. Accordingly, the IO-Link master 3A can determine whether the digital input line 50 is abnormal without mounting conventional hardware such as a leakage current detector and a poly-switch. Resultantly, the abnormality of the digital input line 50 can be detected without enlarging the device or increasing the cost.

In the IO-Link master 3A of the first embodiment, the change of the 10 data transmitted by IO-Link communication is detected using the digital signal value (the DI value in FIG. 3) stored in the data received from the IO-Link device 4 through the IO-Link communication port 121 as the second signal value. However, the control system of the present invention is not limited to the first embodiment. Alternatively, the second signal value may be detected using the analog signal value (the analog value in FIG. 3) stored in the data received from the IO-Link device 4 through the IO-Link communication port 121.

In the case where the analog signal value stored in the data received from the IO-Link device 4 is used as the second signal value, the analog signal value is binarized depending on whether the analog signal value is larger than or equal to a threshold, and the change of the second signal value may be detected by detecting the change of the binarized analog signal.

In the master-slave control system 1A of the first embodiment, the determiner 105A is included in the IO-Link master 3A. However, the control system of the present invention is not limited to the first embodiment. Alternatively, the controller that is the master device may include the determiner that determines whether the digital input line 50 is abnormal. Specifically, the controller includes the first trigger detector, the second trigger detector, and the determiner, the first and second signal values received from the IO-Link device 4 is transmitted to the controller through the field network 7, and the controller may detect the abnormality of the digital input line 50.

Alternatively, the controller includes the determiner, the results detected with the first and second trigger detectors 103 and 104 of the IO-Link master 3A are transmitted to the controller through the field network 7, and the determiner of the controller may detect the abnormality of the digital input line 50.

In the first embodiment, the control system is the master-slave control system including the controller 2 that is the master device and at least one IO-Link master 3A that is the slave device connected to the controller 2 through the network (field network 7). However, the control system of the present invention is not limited to the first embodiment. Any system may be used as long as the system includes a communicator that communicates with an external device according to a predetermined communication protocol and a signal receiver that receives the signal output from the external device.

Modification

A modification of the master-slave control system 1A of the first embodiment will be described below.

The master-slave control system 1A has the configuration in which the IO-Link device 4 is the input-system device, namely, the configuration in which the data obtained with the IO-Link device 4 is output to the controller through the IO-Link master 3A. On the other hand, in the configuration of the IO-Link system of the modification, the device is an output-system IO-Link device (for example, an actuator or a motor), and an instruction is output from the controller to the IO-Link device through the IO-Link master.

In the IO-Link system of the modification, the IO-Link device includes the IO-Link communication port that communicates with the IO-Link master according to a predetermined communication protocol and the digital input port that receives the first signal value output from the IO-Link master. The IO-Link device also includes the determiner that determines the abnormality, which is generated in the digital input line connecting the digital input port to the IO-master, based on the second signal value received through the IO-Link communication port and the first signal value received through the digital input port. Specifically, when the second trigger detector detects the change of the second signal value, the determiner checks whether the first trigger detector detects the change of the first signal value between the first time and the second time, thereby determining whether the digital input line is abnormal.

The first trigger detector, the second trigger detector, and the determiner are software included in the IO-Link device. Accordingly, the IO-Link device can determine whether the digital input line 50 is abnormal without mounting conventional hardware such as a leakage current detector and a poly-switch. Resultantly, the abnormality of the digital input line can be detected without enlarging the IO-Link device or increasing the cost.

Second Embodiment

A second embodiment of the present invention will be described below with reference to FIGS. 6 to 8. For convenience of description, the member having the same function as the first embodiment is designated by the same reference numeral as the first embodiment, and the description is omitted.

An IO-Link master 3B in a master-slave control system 1B of the second embodiment will be described below with reference to FIG. 6. FIG. 6 is a block diagram illustrating a configuration of a main part of the IO-Link master 3B.

Figure 6:
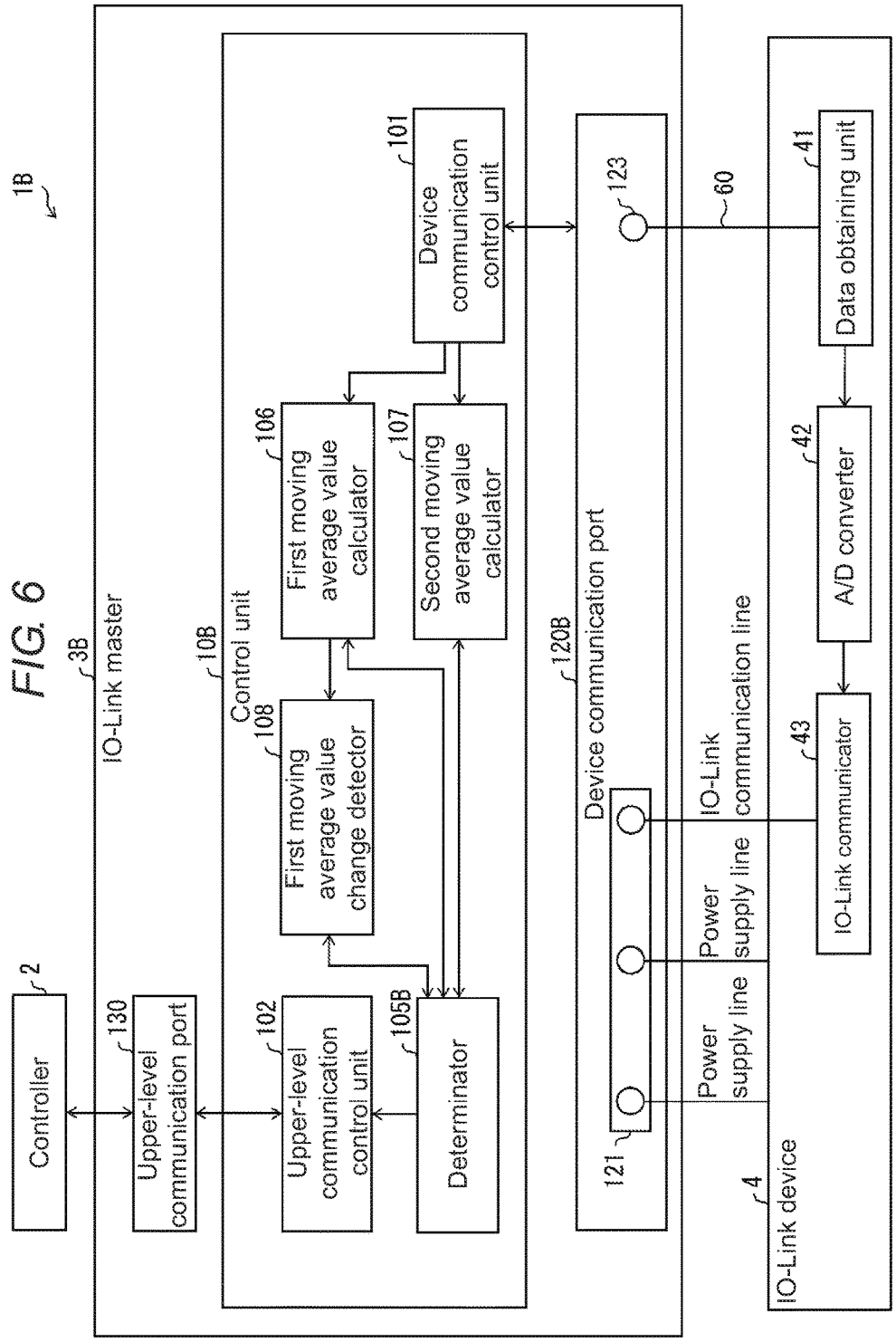
FIG. 6 is a block diagram illustrating a configuration of a main part of an IO-Link master according to a second embodiment of the present invention.

As illustrated in FIG. 6, the IO-Link master 3B includes a device communication port 120B that communicates with the IO-Link device 4 and a control unit 10B.

The device communication port 120B includes the IO-Link communication port 121 and an analog input port 123.

An analog input line (signal line) 60 is connected to the analog input port 123 in order to transmit the analog data obtained with the data obtaining unit 41 of the IO-Link device 4 to the IO-Link master 3B.

The control unit 10B includes a first moving average value calculator 106, a second moving average value calculator 107, a detector 108, and a determiner 105B.

The first moving average value calculator 106 calculates a moving average value (hereinafter, referred to as a first moving average value) of the analog signal value (first signal value), which is obtained with the data obtaining unit 41 of the IO-Link device 4 and is output from the IO-Link device 4 through the analog input port 123, for a predetermined time (for example, one second).

The second moving average value calculator 107 calculates a moving average value (hereinafter, referred to as a second moving average value) of the analog signal value (hereinafter, referred to as a second signal value), which is stored in the data received from the IO-Link device 4 through the IO-Link communication port 121, for a predetermined time (for example, one second).

The detector 108 detects whether the first moving average value calculated with the first moving average value calculator 106 is the upper limit value, the lower limit value, or 0 of the measurement range of the IO-Link device 4.

Based on the first signal value (first moving average value) and the second signal value (second moving average value), the determiner 105B determines the presence or absence of the abnormality generated in the analog input line 60 connecting the analog input port 123 and the IO-Link device 4 to each other. Details will be described later.

(Method for Determining Whether Analog Input Line 60 is Abnormal)

A procedure of a method for determining whether the analog input line 60 is abnormal in the second embodiment will be described below with reference to FIG. 7. FIG. 7 is a flowchart illustrating the procedure of the method for determining whether the analog input line 60 is abnormal.

Figure 7:
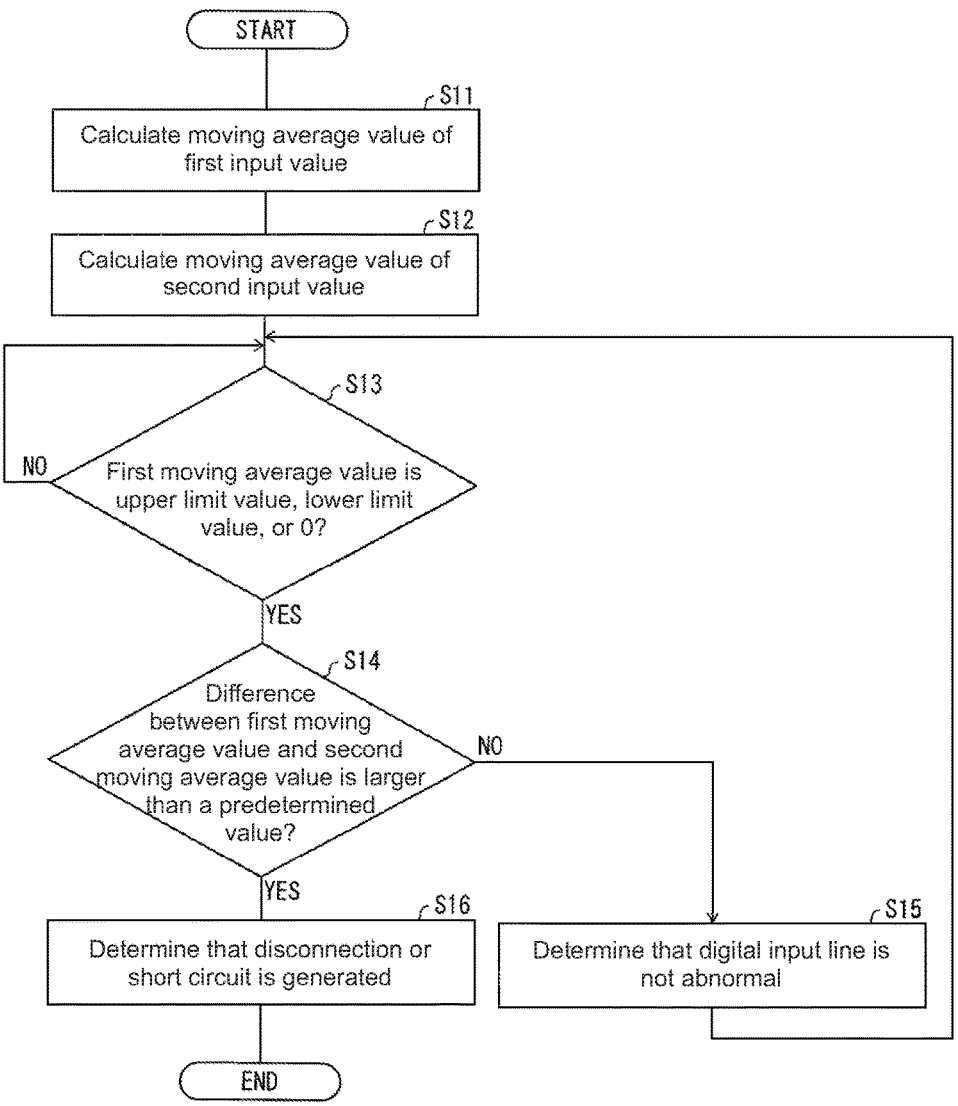
FIG. 7 is a flowchart illustrating a procedure of a method for determining whether the analog input line is abnormal in the second embodiment.

In the method for determining whether the analog input line 60 in the second embodiment is abnormal, as illustrated in FIG. 7, the first moving average value calculator 106 calculates the first moving average value of the first signal value, which is output from the IO-Link device 4 through the analog input port 123, for the predetermined time (S11).

The second moving average value calculator 107 calculates the second moving average value of the analog signal value (second signal value), which is stored in the data received from the IO-Link device 4 through the IO-Link communication port 121, for the predetermined time (S12).

The first and second signal values output from the IO-Link device 4, the first moving average value calculated with the first moving average value calculator 106, and the second moving average value calculated with the second moving average value calculator 107 will be described below with reference to FIG. 8. FIG. 8 is a view illustrating the first and second signal values output from the IO-Link device 4, the first moving average value calculated with the first moving average value calculator 106, and the second moving average value calculated with the second moving average value calculator 107.

Figure 8:
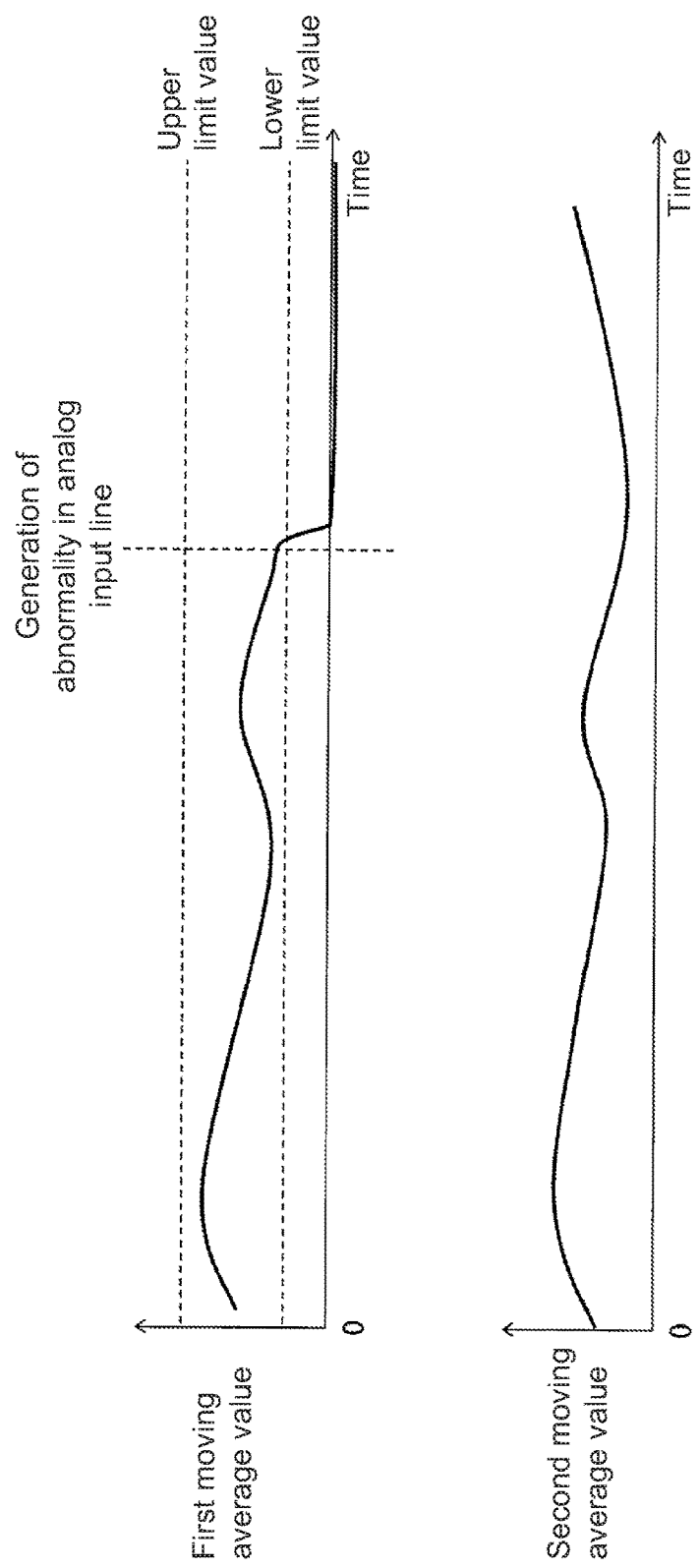
FIG. 8 is a view illustrating first and second signal values output from the IO-Link device of the second embodiment, a first moving average value calculated with a first moving average value calculator, and a second moving average value calculated with a second moving average value calculator.

As illustrated in FIG. 8, the first and second signal values are identical data obtained with the data obtaining unit 41 of the IO-Link device 4. Therefore, in the case where the analog input line 60 and the IO-Link communication line are not abnormal, the IO-Link master 3B obtains the identical data as the first and second signal values.

In the case where the analog input line 60 is abnormal, specifically, in the case where the analog input line 60 is disconnected or short-circuited, the IO-Link master 3B subsequently receives an upper limit value, a lower limit value, or 0 of the measurement range of the IO-Link device 4 as the first signal value. That is, the first signal value does not change. Specifically, in the case where the analog input line 60 is disconnected, only the value of 0 is subsequently received as the first signal value. In the case where the analog input line 60 is short-circuited, the upper limit value or lower limit value of the measurement range of the IO-Link device 4 is received as the first signal value. On the other hand, the second signal value changes because the second signal value obtained by IO-Link communication is normally transmitted.

As illustrated in FIG. 7, the determiner 105B checks whether the detector 108 detects that the first moving average value becomes the upper limit value, the lower limit value, or 0 of the measurement range of the IO-Link device 4 (S13).

When the detector 108 does not detect that the first moving average value becomes the upper limit value, the lower limit value, or 0 of the measurement range of the IO-Link device 4 (NO in S13), the determiner 105B determines that the analog input line 60 is not abnormal, and the flow returns to step S13.

On the other hand, when the detector 108 detects that the first moving average value becomes the upper limit value, the lower limit value, or 0 of the measurement range of the IO-Link device 4 (YES in S13), there is a possibility of generating the abnormality in the analog input line 60. Therefore, the determiner 105B calculates a difference between the first moving average value and the second moving average value, and determines whether the calculated difference is larger than a predetermined value (S14).

When the calculated difference between the first moving average value and the second moving average value is less than or equal to the predetermined value (NO in S14), the determiner 105B determines that the first signal value is a normal value, and determines that the analog input line 60 is not abnormal (S15).

On the other hand, when the calculated difference between the first moving average value and the second moving average value is larger than the predetermined value (YES in S14), the determiner 105B determines that the first signal value is not a normal value, and determines that the analog input line 60 is abnormal (S16).

More specifically, when the detector 108 detects that the first moving average value becomes 0, the determiner 105B can determine that the analog input line 60 is disconnected or short-circuited. When the detector 108 detects that the first moving average value becomes 0 in the configuration in which the measurement range of the IO-Link device 4 does not include 0, the determiner 105B can determine that the analog input line 60 is disconnected.

When the detector 108 detects that the first moving average value becomes the lower limit value (however, the measurement range of the IO-Link device 4 does not include 0) or the upper limit value, the determiner 105B can determine that the analog input line 60 is short-circuited.

It is undefined which one of timing of obtaining a specific signal detected in the IO-Link device 4 as the first signal value through the analog input port 123 and timing of obtaining the specific signal as the second signal value through the IO-Link communication port 121 is earlier. This is because it is uncertain which one of a delay time of the communication cycle time of the IO-Link communication and a processing time necessary to perform analog-digital conversion of the first signal value is longer. On the other hand, in the second embodiment, the first and second signal values are compared to each other using the moving average value, so that the time difference can be absorbed.

As described above, in the master-slave control system 1B of the second embodiment, the determiner 105B determines whether the analog input line 60 is abnormal by calculating the difference between the first average value calculated with the first moving average value calculator 106 and the second average value calculated with the second moving average value calculator 107.

However, the control system of the present invention is not limited to the second embodiment. Alternatively, whether the analog input line 60 is abnormal may be determined by the calculation of the difference between the first and second signal values. However, the use of the difference between the first and second average values absorbs the time difference and decreases an influence of a noise mixed in the analog value, so that the determiner 105B can more certainly determine whether the analog input line 60 is abnormal.

In the master-slave control system 1B of the second embodiment, when the detector 108 detects that the first moving average value becomes the upper limit value, the lower limit value, or 0, the determiner 105B determines whether the analog input line 60 is abnormal. However, the control system of the present invention is not limited to the second embodiment. Alternatively, whether the analog input line 60 is abnormal may be determined by the calculation of the difference between the first and second average values at all times. Even in this configuration, the determiner can determine whether the analog input line 60 is abnormal. However, in this case, because the first signal value is not recognized, the determiner cannot determine whether the abnormality of the analog input line 60 is caused by the disconnection or the short circuit.

Implementation Example by Software

A control block (particularly each unit included in each of the control units 10A and 10B) of each of the IO-Link masters 3A and 3B is implemented by software using a CPU (Central Processing Unit).

Each of IO-Link masters 3A and 3B includes the CPU that executes a command of the program that is software implementing each function, a ROM (Read Only Memory) or a storage device (referred to as a "recording medium") in which the program and various pieces of data are recorded so as to be readable with the computer (or the CPU), and a RAM (Random Access Memory) in which the program is expanded. The computer (or the CPU) reads the program from the recording medium to execute the program, thereby achieving the object of the present invention. A "non-transient physical medium" such as a tape, a disk, a card, a semiconductor memory, and a programmable logic circuit can be used as the recording medium. The program may be supplied to the computer through any transmission medium, such as a communication network and a broadcasting wave, which can transmit the program. The present invention can be implemented even in a mode of a data signal. The data signal is embedded in a carrier wave, and the program is provided by electronic transmission in the data signal.

The present invention is not limited to the embodiments, but various changes can be made without departing from the scope of the claims. It is noted that the embodiment obtained by a combination of different embodiments is also included in the scope of the present invention.

The invention claimed is:

1. A control system comprising a processor configured with a program to perform operations comprising:

operation as a device communication port comprising a signal receiver configured to receive a first signal from an external device and communicator configured to receive a second signal from the external device according to a predetermined communication protocol; and operation as a determiner configured to determine whether a signal line connecting the signal receiver to the external device is abnormal based on a determined condition associated with the first signal and the second signal.

2. The control system according to claim 1, wherein the determined condition comprises a change in one of: the first signal and the second signal;

the processor is further configured with the program to perform operations comprising:

operation as a first detector configured to detect the change of the first signal; and operation as a second detector configured to detect the change in the second signal, the first signal comprises a binarized digital signal, and the processor is configured with the program to perform operations such that operation as the determiner comprises operation as the determiner configured to:

check whether the change in the first signal is detected between a second time and a first time comprising a predetermined amount of time before the second time, the second time comprising a time when the second detector detects the change in the second signal, and determine that the signal line is abnormal when the change in the first signal is not detected between the first time and the second time, and determines that the signal line is not abnormal when the change in the first signal is detected between the first time and the second time.

3. The control system according to claim 2, wherein the second signal comprises an analog output, and the second detector binarizes the second signal based on the second signal being less than or equal to a threshold, and detects a change of the binarized second signal to detect the change of the second signal.

4. The control system according to claim 2, wherein the predetermined amount of time is twice a time of a communication cycle of the communicator.

5. The control system according to claim 1, wherein
the determined condition comprises an analog value of one of: the first signal and the second signal,
the first signal and second signal are analog outputs,
the processor is configured with the program to perform operations such that operation as the determiner comprises operation as the determiner configured to:
calculate a difference between the analog value of the first signal and the analog value of the second signal, and
determine that the signal line is abnormal when the difference is larger than a predetermined value, and determines that the signal line is not abnormal when the difference is less than or equal to the predetermined value.

6. The control system according to claim 5, wherein the processor is further configured with the program to perform operations comprising:
operation as a first moving average value calculator configured to calculate a first moving average that comprises a moving average of the analog value of the first signal for a predetermined time; and
operation as a second moving average value calculator configured to calculate a second moving average that comprises a moving average of the analog value of the second signal for a predetermined time,
wherein
the processor is configured with the program to perform operations such that operation as the determiner comprises operation as the determiner configured to:
calculate the difference between the first moving average and the second moving average, and
determine that the signal line is abnormal when the difference is larger than a second predetermined value, and determines that the signal line is not abnormal when the difference is less than or equal to the second predetermined value.

7. The control system according to claim 6, wherein the processor is further configured with the program to perform operations comprising operation as a detector configured to detect whether the first moving average becomes an upper limit value, a lower limit value, or 0, and
the processor is configured with the program to perform operations such that when the detector detects that the first moving average becomes the upper limit value, the lower limit value, or 0, the processor is configured with the program to perform operations such that operation as the determiner comprises operation as the determiner that calculates the difference between the first moving average and the second moving average to determine whether the signal line is abnormal.

8. The control system according to claim 1, wherein the external device comprises a detection device that detects a predetermined state.

9. The control system according to claim 1, wherein the external device comprises a single-drop digital communication interface for small sensors and actuators device, and the control system acts as a single-drop digital communication interface for small sensors and actuators master.

10. A control method comprising:
receiving a second signal from an external device according to a predetermined communication protocol;
receiving a first signal from the external device; and
determining whether a signal line through which the first signal is transmitted is abnormal based on a determined condition associated with the first signal and the second signal.

11. The method according to claim 10, wherein the determined condition comprises a change in one of: the first signal and the second signal;
the method further comprising:
checking whether the change in the first signal occurs between a second time and a first time comprising a predetermined amount of time before the second time, the second time comprising a time when the change in the second signal is detected; and
determining that the signal line is abnormal when the change in the first signal does not occur between the first time and the second time and that the signal line is not abnormal when the change in the first signal occurs between the first time and the second time.

12. The method according to claim 11, wherein the second signal comprises an analog output, the method further comprising:
binarizing the second signal based on the second signal being less than or equal to a threshold; and
detecting a change of the binarized second signal to detect the change of the second signal.

13. The method according to claim 11, wherein the predetermined amount of time comprises twice a time of a communication cycle.

14. The method according to claim 10, wherein
the first signal and second signal comprise analog outputs, and
the determined condition comprises an analog value of one of: the first signal and the second signal;
the method further comprising:
calculating a difference between the analog value of the first signal and the analog value of the second signal; and
determining that the signal line is abnormal when the difference is larger than a predetermined value, and determining that the signal line is not abnormal when the difference is less than or equal to the predetermined value.

15. The method according to claim 14, further comprising:
calculating a first moving average comprising a moving average of the analog value of the first signal for a predetermined time;
calculating a second moving average comprising a moving average of the analog value of the second signal for the predetermined time;
calculating a difference between the first moving average and the second moving average; and
determining that the signal line is abnormal when the difference is larger than a second predetermined value, and determining that the signal line is not abnormal when the difference is less than or equal to the second predetermined value.

16. The method according to claim 15, wherein calculating the difference between the first moving average and the second moving average comprises calculating the difference between the first moving average and the second moving average when the first moving average becomes an upper limit value, a lower limit value, or 0.

17. The method according to claim 10, wherein the external device comprises a detection device that detects a predetermined state.

18. The method according to claim 10, wherein the external device comprises a single-drop digital communication interface for small sensors and actuators device.

19. A non-transitory computer-readable recording medium storing instructions which, when executed by a processor, cause the processor to perform operations comprising:
    receiving a first signal from an external device;
    receiving a second signal from the external device according to a predetermined communication protocol; and
    determining whether a signal line through which the first signal is transmitted is abnormal based on a determined condition associated with the first signal and the second signal.

* * * * *